INVENTORS
HIROOMI KOJIMA, SADAO NOMURA
AND AKIO KUMADA
BY Craig, Antonelli, Stewart & Hill
ATTORNEYS June 6, 1972 HIROOMI KOJIMA ET AL 3,667,828
DIGITAL LIGHT DEFLECTOR
Filed June 12, 1970 2 Sheets-Sheet 2
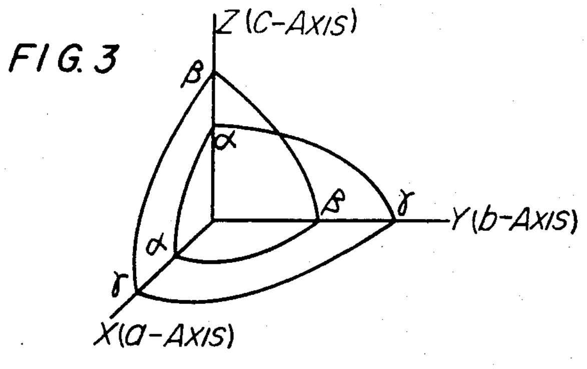
FIG. 4
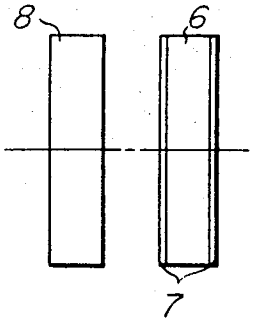
FIG. 5
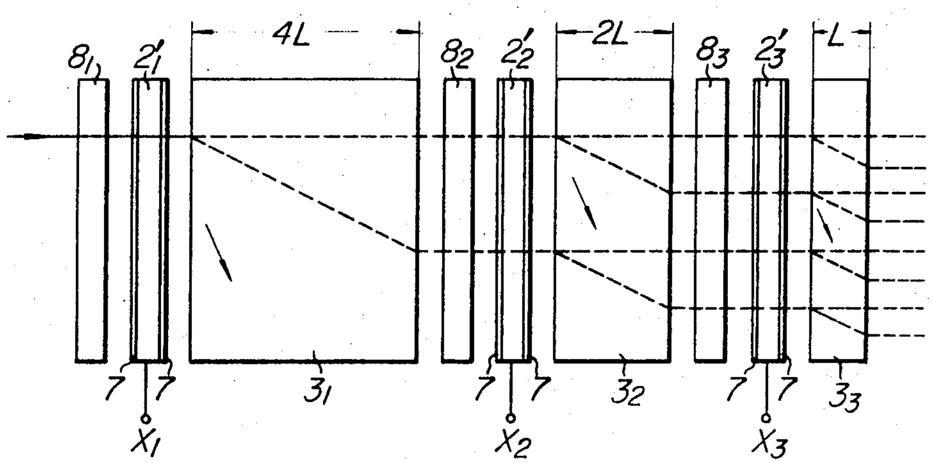
FIG. 6
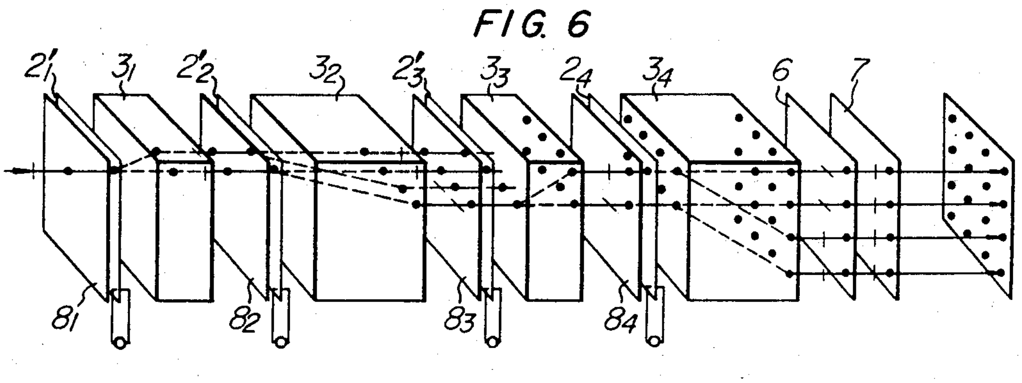
INVENTORS
HIROOMI KOJIMA, SADAO NOMURA
AND AKIO KUMADA
BY
Craig, Antonelli, Stewart & Hill
ATTORNEYS United States Patent Office 3,667,828

Patented June 6, 1972

3,667,828

DIGITAL LIGHT DEFLECTOR

Hiroomi Kojima, Hachioji, Sadao Nomura, Tokyo, and Akio Kumada, Kodaira, Japan, assignors to Hitachi, Ltd., Tokyo, Japan Filed June 12, 1970, Ser. No. 45,835
Claims priority, application Japan, June 30, 1969, 44/51,608
Int. Cl. G02f 1/20
U.S. Cl. 350—150 5 Claims

ABSTRACT OF THE DISCLOSURE

A digital light deflector comprising a cascade arrangements of $n$ stages of a quarter-wave irregular ferroelectric crystal and a unit constituted by a uniaxial birefringent crystal cut at its opposite surfaces with a specified angle to an optic axis thereof and a quarter-wave plate, opposite $z$ surfaces of said irregular ferroelectric crystal being provided with an electrical means for apply an electric field at least equal to the coercive field of said crystal, if necessary, to deflect the light being transmitted through said unit.

FIELD OF THE INVENTION

The present invention relates to a digital light deflector comprising a light modulator utilizing a crystal with a new electro-optical effect and a uniaxial birefringent crystal.

BRIEF DESCRIPTION OF THE DRAWINGS

FIG. 3 is a diagram showing a part of an indicatrix ellipsoid of said electro-optical crystal.

FIG. 4 is a diagram showing a combination of a quarter-wave plate and an electro-optic crystal utilized in the light deflector according to the present invention.

FIG. 5 is a diagram showing one embodiment of the light deflector according to the present invention.

FIG. 6 is another embodiment of the invention.

DESCRIPTION OF THE PRIOR ART

Such a method as proposed by T. J. Nelson et al. of the Bell Telephone Laboratories, U.S.A., is known for employing a digital light deflection method. This method comprises a cascade arrangement of $n$ stages of light deflectors composed of a crystal with an electro-optical effect and a uniaxial birefringent crystal.

Figure 1:
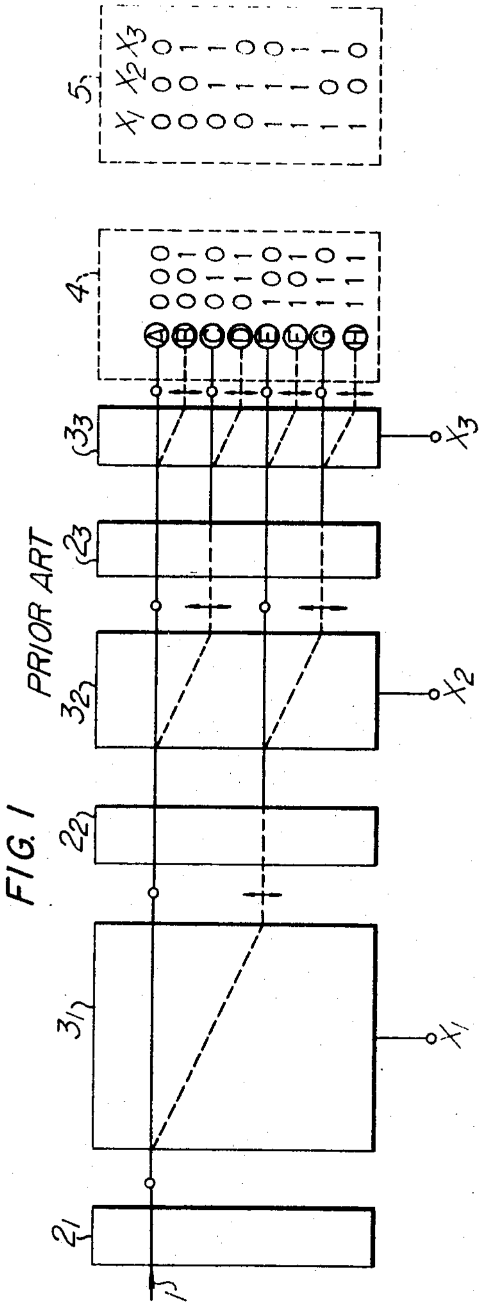
PRIOR ART FIG. 1
FIG. 1 is a block diagram showing the principle of a conventional digital light deflector.

For simplification of the explanation, three stages of digital light deflectors are shown in FIG. 1. In FIGS. 1, $2_1$, $2_2$ and $2_3$ designate crystals such as potassium dihydrogen phosphate (hereinafter referred to as KDP) which are cut at their opposite surfaces perpendicularly to the $c$-axis (hereinafter referred to as the $c$-cut plane). These crystals have such an electro-optic effect as follows. That is to say, when an electric field is applied in the direction of their optic axis, a refraction index $n$ for a light having a vibration plane parallel to the $a$- and $b$-axes which are orthogonal to one another is given by:

$$n=n_0\left(1\pm\frac{\gamma_{63}E_z}{2}n_0^2\right)$$

where $n_0$ is a refractive index for an ordinary ray when an applied electric field $E=0$, $\gamma_{63}$ is the linear electro-optic coefficient, $E_z$ is the $c$-axis component of the applied electric field. $3_1$, $3_2$ and $3_3$ designate uniaxial birefringent crystals respectively cut with such a slight angle to an optic axis that an ordinary ray can travel therein perpendicularly to its opposite cut surfaces. This cutting angle (to an optic angle O) varies with each crystal as shown in the following table, for example:

| Crystal: | Cutting angle to an optic axis, degrees |
|---|---|
| $NaNO_3$ | 49 |
| $CaCO_3$ | 51 |
| Potassium dihydrogen phosphate | 54 |

Birefringent crystals $3_1$, $3_2$ and $3_3$ are arranged in such a manner that the thickness between opposite surfaces of the respective crystal successively increases with a ratio of 4:2:1 (or successively decreases with a ratio of ¼:½:1).

Said crystals possessing an electro-optic effect (hereinafter referred to as electro-optic crystals) $2_1$, $2_2$ and $3_3$ are provided with $c$-cut planes for applying a half-wave retardation voltage thereto (i.e., the voltage which is just necessary for giving a retardation of 180° to a plane-polarized light having a vibration plane parallel to said $a$- and $b$-axes is transmitted through the crystals). 4 indicates a binary representation of deflected light beams and 5 indicates a combination of applied voltages (half-wave retardation voltages) to each electro-optic crystal, where 1 represents the state under an applied voltage and 0 represents the state when no voltage is applied to the crystal. $X_1$, $X_2$ and $X_3$ represent modulating voltage sources for the crystals $2_1$, $2_2$ and $2_3$ respectively.

Suppose that a plane-polarized light having a plane of polarization perpendicular to the paper is applied to such a light deflector as mentioned above.

(1) When no modulation voltage is applied to any of the crystals $2_1$, $2_2$ and $2_3$, the applied plane-polarized light 1 goes straight on to a deflected position A, and (2) When a modulation voltage is applied to the crystal $2_3$ only, a plane of polarization of the light transmitted from the crystal $2_3$ rotates 90° and the plane-polarized light having such a plane of polarization is refracted in the birefringent crystal $3_3$ and reaches a deflected position B (represented by B).

Thus, each electro-optic crystal constituting a light deflector can deflect a light to any position from A to H according to the combination of modulating voltages applied thereto. In this description, the light deflector composed of three stages has been explained. More generally, a light deflector constituted by $n$ stages can deflect a light in any one of $2^n$ directions.

Then, the $c$-cut plate of KDP has been widely used for the above-mentioned electro-optic crystal, but requires a very high voltage of about 10 kv. for the half-wave retardation voltage. As a matter of course, in order to reduce this high voltage, it may be effective to use several crystals connected in cascade. However, such a deflector becomes large sized.

SUMMARY OF THE INVENTION

It is an object of the present invention to provide a digital light deflector operating easily with a low modulation voltage.

It is another object of the present invention to provide a small-sized light deflector utilizing electro-optic crystals.

The present invention comprises a light modulator using a crystal possessing a new electro-optic effect and a quarter-wave plate, and such a uniaxial birefringent crystal as conventionally used for a light deflector.

The above-mentioned crystal with new electro-optic effect is a biaxial birefringent crystal from a crystallopti-cal point of view. When an electric field or a stress of more than a characteristic value of the crystal is applied to the crystal, the direction of the spontaneous polarization thereof is reversed and at the same time a unit cell undergoes such a transformation of the lattice as a rotation of 90° around the axis *c*.

Figure 2B:
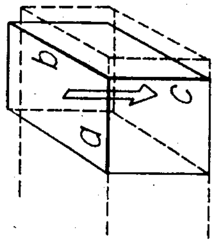
FIGS. 2a and 2b are schematic diagrams showing the relation between the direction of spontaneous polarization and a unit cell of an electro-optic crystal utilized as a light deflector according to the present invention.
Figure 2A:
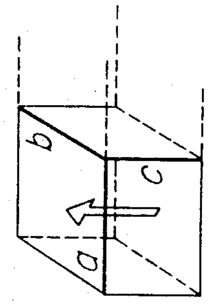

According to studies made by the inventors, it was found that some kinds of ferroelectrics such as KDP (potassium dihydrogen phosphate) or molybdate gadolinium oxide (hereinafter referred to as MOG) have the property that when an electric field or a stress of more than a certain value of the ferroelectrics (hereinafter refered to as coercive field or coercive stress) is applied to the ferroelectrics, they are transformed from one lattice state to another and at the same time the direction of the spontaneous polarization thereof is reversed as shown in FIGS. 2*a* and 2*b* in contrast to the known ferroelectrics such as triglycine sulphate (hereinafter referred to as TGS), lead titanate-zirconate (hereinafter referred to as PZT), or barium titanate. Moreover, the above-mentioned transition of the lattice state is equivalent to a rotation of 90° around the axis *c* from the crystallographical viewpoint. The inventors called such a ferroelectric crystal an irregular ferroelectric crystal.

Such a crystal as the above-mentioned KDP or MOG belongs to the point group *mm*2. All crystals belonging to the point group *mm*2 have not such a new ferroelectric property, but only the ferroelectric crystals have this property. Therefore, hereinafter a symbol for the point group *imm*2 will be particularly used.

The crystal belonging to the above-mentioned point group *imm*2 is optically a biaxial and birefringent crystal. FIG. 3 shows a part of the indicatrix ellipsoid. In FIG. 3, $\alpha$, $\beta$ or $\gamma$ indicates refractive indices of light having a vibration plane that is parallel to the axis, *a*, *b* or *c* respectively, and is different from one another.

In an MOG crystal belonging to the point group *imm*2, for example, $$\lambda=589.3$$
$$n_a=1.842_8$$
$$n_b=1.843_2 \text{ and}$$
$$n_c=1.897$$

As stated above, crystals belonging to the point group *imm*2 such as MOG are biaxial and birefringent. Consequently, if plane-polarized light is directed to a *c*-cut plate (cut perpendicularly to the *c*-axis) of such an MOG crystal with a vibration plane forming an angle of 45° with both an *a*- and a *b*-axis, as shown in FIG. 3, the retardation R of light transmitted through the crystal in the direction of the *c*-axis is given by the formula:

$$R=\frac{2\pi}{\lambda}\Delta n\cdot d$$

Where $\Delta n$ is the difference between the refractive indices for the vibration components of the incident plane-polarized light in the direction of the *a*- and *b*-axis, *d* is the thickness of the crystal and $\lambda$ is the wavelength of the incident plane-polarized light.

If such a *c*-cut crystal with a thickness of *d* is used for a quarter-wave plate (hereinafter referred to as an irregular ferroelectric element) in combination with the quarter-wave plate 8, as shown in FIG. 4, the irregular ferroelectric element being provided with transparent electrodes at its *c*-cut surfaces and if the retardation of the irregular ferroelectric element in a certain polarizing state is given by the formula:

$$R=\frac{2\pi}{\lambda}\Delta nd\frac{\pi}{2}$$

where the phase difference of $\pi$ is given by the resultant retardation of the irregular ferroelectric element and the quarter-wave plate 8 so that the plane of polarization of the plane-polarized light applied parallel to the *c*-axis rotates 90° in order to be transmitted. Then, if a modulating voltage is applied to the irregular ferrolectric element through the above-mentioned electrodes, the axes *a* and *b* rotate 90° around the axis *c* so that the retardation of this element is given by the formula:

$$R=-\frac{2}{\lambda}\Delta nd\frac{\pi}{2}$$

Therefore, the resultant retardation of this element and the quarter-wave plate becomes zero and the incident plane-polarized light can pass through without varying the state of polarization.

Further, if a thin MOG crystal with a thickness of about 300$\mu$ is used for example, the applied voltage may be approximately 170 v.

DESCRIPTION OF THE PREFERRED EMBODIMENTS

Some embodiments of the invention will now be described.

Example 1

FIG. 5 shows a light deflector according to the present invention. In FIG. 5, $2_{1'}$, $2_{2'}$ and $2_{3'}$, designate *c*-cut MOG elements with a thickness of 300$\mu$, the *c*-cut surfaces of which are provided with transparent electrodes 7 connected with voltage sources $X_1$, $X_2$ and $X_3$ respectively through lead wires. $3_1$, $3_2$ and $3_3$ designate calcites having their surfaces cut with an angle of 39° to their optic axis, with the thickness ratio of $3_1$, $3_2$ and $3_3$ being 4:2:1. $8_1$, $8_2$ and $8_3$ are prior quarter-wave plates. An applied voltage to each MOG element is 170 v. A He-Ne laser light of 6328 A. radiating from a Brewster's discharge tube was utilized to operate the light deflector of this embodiment.

Example 2

FIG. 6 shows another embodiment of the present invention. In FIG. 6, all $8_1$, $8_2$ $8_3$ and $8_4$ are prior quarter-wave plates. $2_{1'}$, $2_{2'}$, $2_{3'}$ and $2_{4'}$ designate light modulators comprising MOG crystals with a thickness of a quater-wavelength, each opposite *z* surfaces of which are provided with transparent electrodes. $3_1$, $3_2$, $3_3$ and $3_4$ designate calcites, opposite surfaces of which are cut with an angle of 51° to their optical axis. The thicknesses of $3_2$ and $3_4$ are twice (or three times, four times, etc., that is, integer number of times) as much as the thicknesses of $3_1$ and $3_3$ respectively. $3_1$ and $3_2$ are arranged parallel to the optic axis O. $3_3$ and $3_4$ are arranged orthogonally (or at the required angle) to the optic axis of $3_1$ and $3_3$. Such means as mentioned above is a conventional deflector of two dimmentional four points deflecting a light beam in the directions of two orthogonal axes according to the operation of the light modulator. A polarization control means 6 and a polarization plate 7 are shown in FIG. 6. The polarization control means 6 is controlled in the same manner as in the Example 1. When the number of "ON" modulators among $2_{1'}$, $2_{2'}$, $2_{3'}$ and $2_{4'}$ are odd, a light beam is deflected into any one of upper eight points. At this time, if the light modulator 6 is turned on, all beams are obtained in the same plane of polarization as that of the incident beam. Thus, improvement of the signal to noise ratio, switching operation of the digital polarized beam and parity check are performed in such a manner as given in Example 1.

According to the investigation made by the inventors, it has been found that some crystals among the crystals belonging to the point groups *mm*2, 2–I and 2–II fall within the category of the irregular ferroelectrics mentioned above.

Materials such as shown in the following Table I are known as irregular ferroelectric materials belonging to these point groups.

TABLE I

| Point group: | Material |
|---|---|
| *imm*2 | KDP, MOG. |
| *i*2–*I* | |
| *i*2–*II* | Rochelle salt; ammonium cadmium sulphate, $(NH_4)_2Cd_2(SO_4)_3$; methyl-ammonium aluminium sulphate; dodecahydrate, $(CH_3NH_3)Al(SO_4)_2\cdot 12H_2O$. |

According to various investigations made by the inventors it has been found that MOG and its crystallographic isomorphs, that is, $(R_xR'_{1-x})_2O_3 \cdot 3Mo_{1-e}W_eO_3$ (where, R and R' are at least one element of the rare earths, $x$ is a number of 0–1.0, and $e$ is a number of 0–1.2) show the properties that can be utilized in the present invention and belongs to the orthorhombic system of crystallography and to the point groups *mm*2.

Now, a crystal, $(R_xR'_{1-x})_2O_3 \cdot 3Mo_{1-e}W_eO_3$, of the MOG crystal structure employed in the present invention will be explained, hereinafter.

A method of producing a single crystal having an MOG structure is disclosed in U.S. Pat. No. 3,437,432 and the crystal structure treated by the said method is of the same $a$ and $b$ unit cell dimension.

The unit cell dimensions of MOG used in this invention have been determined by using an X-ray goniometer and by an X-ray diffraction method, as follows:

$$a=10.38\pm0.005 \text{ A.}$$

$$b=10.426\pm0.005 \text{ A.}$$

$$c=10.709\pm0.005 \text{ A.}$$

As to $Eu_2(MoO_4)_3$, $Tb_2(MoO_4)_3$, $Dy_2(MoO_4)_3$ and $Sm_2(MoO_4)_3$ which are isomorphous of MOG, it has been found from the measurement by an X-ray diffraction method that the unit cell dimension along the axis $a$ is different from that along the axis $b$ in all of these crystals as shown in Table II.

TABLE II

| Material | Angstroms *a* | *b* | *c* |
|---|---|---|---|
| $Eu_2(MoO_4)_3$ | 10.377±0.005 | 10.472±0.005 | 10.655±0.005 |
| $Gd_2(MoO_4)_3$ | 10.388±0.005 | 10.426±0.005 | 10.709±0.005 |
| $Dy_2(MoO_4)_3$ | 10.331±0.005 | 10.346±0.005 | 10.603±0.005 |
| $Sm_2(MoO_4)_3$ | 10.478±0.005 | 10.511±0.005 | 10.856±0.005 |

Each single crystal of MOG, $Sm_2(MoO_4)_3$, $Eu_2(MoO_4)_3$ $Tb_2(MoO_4)_3$ and $Dy_2(MoO_4)_3$ was cut in parallel with (100), (010), (001) planes which are perpendicular to the axes $a$, $b$, $c$, respectively, and was subjected to polling by being impressed with an electric field or a mechanical stress to be made into a single domain structure. (This was verified by observing a specimen through a polarizing microscope with plane polarized light directed in the direction of the axis $c$ while manipulating a crossed polar.) The intensity distribution of light reflected from the surfaces of the crystal was measured with an X-ray three axes goniometer. The planes the reflected light from which was measured, were (400), (600), (800), (1000), and also (003), (004), (005). Further, after the measurement of the reflected light, the axes $a$ and $b$ of the crystal were interchanged by applying an inverse electric field in the direction of the axis $c$ or by applying a stress in the direction of the axis $c$, and the crystal is made of a single domain. Then again, the intensity distribution of the light reflected from planes (040), (060), (080) and (0100) was determined under the following conditions of measurement. That is, Cu-K rays from an X-ray source energized with a voltage of 30 kv. and a current of 10 ma. were directed to the crystal through a divergence slit 10 mm. wide, a scattering slit 10 mm. wide and an entrance slit 0.1 mm. wide. The scanning speed of the goniometer was ¼ degree/min. and the radius of a Geiger counter used was 185 mm. Further, when the crystal was heated above the Curie temperature thereby to release it from the polled state and then cooled, it became of a multi-domain structure and the difference between the cell dimensions $a$ and $b$ became indistinct.

Some of the irregular ferroelectric crystals used in this invention are single crystals and solid solutions of chemical compounds of the MOG crystal structure. Several of them have been shown in Table I.

The structure of such a crystal is greatly affected by the size of positive ions contained therein. If the positive ions are too large or too small, a different structure will result. The Arrhenius ion radii of ions of rare earths are as follows: $Sm^{+3}$: 1.00 A., $Eu^{+3}$: 0.98 A., $Gd^{+3}$: 0.97 A., Tb: 0.93 A. and Dy: 0.92 A. Therefore, $$(R_xR'_{1-x})_2O_3 \cdot 3Mo_{1-e}W_eO_3$$

formed with these ion radii will have the same MOG crystal structure.

The MOG crystal used in this invention belongs to the orthorhombic system and to the point group *mm*2 and has a spontaneous strain $X_S$ as follows:

$$X_s=\frac{b\sim a}{a+b}>5\times10^{-4}$$

A crystal having such unit dimension is remarkably affected by the polling. The MOG crystal used in this invention has the following properties:

Color: Colorless and transparent
Density: 4600 kg./m.$^3$
Point group: Orthorhombic, *mm*2, ferro-electric phase at temperatures below the Curie point; Tetragonal, 42 m., paraelectric phase at temperatures above the Curie point
Phase transition temp.: 162°±3° C.
Melting point: 1170° C.
Cleavage plane: (110), (001)
Specific dielectric constants in the direction of axes $a$, $b$ and $c$: $Ec=10.5$, $Ea\doteqdot Eb=9.5$ (at 20° C.)
Spontaneous polarization:

$$1.86\times10^{-3}\frac{C}{m.^2}\left(\begin{matrix}\text{axis } c\\ \text{direction}\end{matrix}\right)$$

Spontaneous strain: $1.5\times10^{-3}$
Elastic compliance:

$$25\times10^{-12}\left(\frac{m.^2}{\text{Newton}}\right)$$

Coercive field:

$$6\times10^5\left(\frac{V}{m.^2}\right)$$

Coercive stress:

$$1.4\times10^5\left(\frac{\text{Newton}}{m.^2}\right)$$

Electrical resistivity: higher than $10^{10}\Omega$m.
Resistivity to water and chemicals: Good
Efflorescence and diliquescence: None Now, a method of producing MOG crystal used in this invention will be described.

$Gd_2O_3$ of 361.8 g. and $MoO_3$ of 431.7 g. were mixed to make a pellet by applying a given pressure thereto. This MOG disc was placed in a platinum melting box or on a platinum plate in an alumina melting pot to be heated at 700° C. in an electric furnace for from two to four hours. After removal from the furnace, this disc was shattered and stirred, then pressure was applied thereto again. This MOG disc was placed in the furnace with the same process as the previous one and heated at 1000° C. in the electric furnace for from two or four hours. As a result of observation by powder X-rays diffraction, this product was found to be of MOG crystal structure.

Furthermore, the above-mentioned MOG powder was placed in a platinum melting pot to be heated and fused at approximate 1190° C. Then, a platinum wire of 1 mm.$\phi$ was soaked in the fused liquid of MOG to form a seed crystal and cooled slowly until the fused liquid solidified on the platinum, rotating it at from 30 to 60 r./min. Next, the platinum wire was pulled up at a speed of from 18 to 1.5 mm./hr. At this time, the input of the induction coil was increased until the diameter of the seed crystal became approximate 1 mm. The input of the furnace was decreased until the diameter of the crystal product formed around such a seed crystal of 1 mm. became approximate from 10 to 15 mm.$\phi$. The pulling-up speed was from 18 to 1.5 mm./hr. as mentioned above and the input was controlled to keep the diameter of the crystal product in the range of from 10 to 15 mm. When the length of the crystal product became from 30 to 70 mm., the output was increased to make the crystal thin and to separate it from the fused MOG.

This separated crystal was again placed in the after-heater and cooled at the rate of from 50 to 100° C./hr. to be protected from cracking.

The MOG single crystal was thus obtained. This MOG was subjected to polling to obtain MOG of the same unit cell dimension as shown in Table II.

The following Table III shows some of the crystallographic isomorphs of the MOG crystal structures used in the present invention. Methods of growing single crystals of materials 2 to 50 in the Table III are based on the method described in the above example, wherein each reactive material is heated at a temperature below the melting point of the compound to form a solid solution. An amount of reactive material is the same as the composition formula of the second column in the Table III. Then, this compound is heated and the single crystal is pulled up from the fused material with the process described in the above example.

TABLE III

| No. | Chemical formula of single crystal | Reactive material (mixture ratio): Molybdate part | Reactive material (mixture ratio): Rare earth part |
|---|---|---|---|
| 2 | $Sn_2(MoO_4)_3$ | 431.8 | $Sm_2O_3$, 348.7 |
| 3 | $Eu_2(MoO_4)_3$ | 431.8 | $Eu_2O_3$, 352.0 |
| 4 | $Dy_2(MoO_4)_3$ | 431.8 | $Dy_2O_3$, 373.0 |
| 5 | $Tb_2(MoO_4)_3$ | 833.6 | $Tb_2O_3$, 748.8 |
| 6 | $(Gd_{0.5}Sm_{0.5})_2(MoO_4)_3$ | 431.8 | $Gd_2O_3$, 180.9; $Sm_2O_3$, 174.3 |
| 7 | $(Gd_{0.5}Eu_{0.5})_2(MoO_4)_3$ | 431.8 | $Gd_2O_3$, 180.9; $Eu_2O_3$, 176.0 |
| 8 | $(Gd_{0.5}Tb_{0.5})_2(MoO_4)_3$ | 431.8 | $Gd_2O_3$, 180.9; $Tb_2O_3$, 187.2 |
| 9 | $(Gd_{0.5}Dy_{0.5})_2(MoO_4)_3$ | 431.8 | $Gd_2O_3$, 180.9; $Dy_2O_3$, 186.5 |
| 10 | $(Gd_{0.95}Yb_{0.85})_2(MoO_4)_3$ | 431.8 | $Gd_2O_3$, 343.7; $Yb_2O_3$, 19.7 |
| 11 | $(Gd_{0.95}Ho_{0.05})_2(MoO_4)_3$ | 431.8 | $Gd_2O_3$, 343.7; $Ho_2O_3$, 18.9 |
| 12 | $(Gd_{0.95}Lu_{0.05})_2(MoO_4)_3$ | 431.8 | $Gd_2O_3$, 313.7; $Lu_2O_3$, 19.9 |
| 13 | $(Gd_{.95}Tm_{0.05})_2(MoO_4)_3$ | 431.8 | $Gd_2O_3$, 343.7; $Tm_2O_3$, 19.3 |
| 14 | $(Gd_{0.95}Sc_{0.05})_2(MoO_4)_3$ | 431.8 | $Gd_2O_3$, 343.7; $Sc_2O_3$, 6.9 |
| 15 | $(Gd_{0.95}La_{0.05})_2(MoO_4)_3$ | 431.8 | $Gd_2O_3$, 343.9; $La_2O_3$, 16.3 |
| 16 | $(Gd_{0.95}Pr_{0.05})_2(MoO_4)_3$ | 431.8 | $Gd_2O_3$, 343.9; $Pr_6O_{11}$, 17.0 |
| 17 | $(Gd_{0.6}Y_{0.4})_2(MoO_4)_3$ | 431.8 | $Gd_2O_3$, 217.0; $Y_2O_3$, 90.3 |
| 18 | $(Gd_{0.6}La_{0.4})_2(MoO_4)_3$ | 431.8 | $Gd_2O_3$, 217; $La_2O_3$, 130.0 |
| 19 | $(Gd_{0.60}Tb_{0.20}Dy_{0.20})_2(MoO_4)_3$ | 431.8 | $Gd_2O_3$, 217; $Dy_2O_3$, 74.6; $Tb_4O_7$, 78.8 |
| 20 | $(Gd_{0.70}Eu_{0.20}Dy_{0.10})_2(MoO_4)_3$ | 431.8 | $Gd_2O_3$, 253.3; $Eu_2O_3$, 70.4; $Dy_2O_3$, 37.3 |
| 21 | $(Gd_{0.60}Sm_{0.20}Tb_{0.10})_2(MoO_4)_3$ | 431.8 | $Gd_2O_3$, 217.0; $Sm_2O_3$, 69.7; $Tb_4O_7$, 39.4 |
| 22 | $(Gd_{0.70}Eu_{0.20}Tn_{0.10})_2(MoO_4)_3$ | 431.8 | $Gd_2O_3$, 253.3; $Eu_2O_3$, 70.4; $Tb_4O_7$, 39.4 |
| 23 | $(Gd_{0.7}Y_{0.2}La_{0.1})_2(MoO_4)_3$ | 431.8 | $Gd_2O_3$, 253.3; $La_2O_3$, 32.6; $Y_2O_3$, 45.2 |
| 24 | $(Gd_{0.7}Eu_{0.20}Ho_{0.10})_2(MoO_4)_3$ | 431.8 | $Gd_2O_3$, 253.3; $Eu_2O_3$, 70.4; $Ho_2O_3$, 37.8 |
| 25 | $(Gd_{0.7}Sm_{0.1}Eu_{0.1}Y_{0.1})_2(MoO_4)_3$ | 431.8 | $Gd_2O_3$, 253.3; $Sm_2O_3$, 34.9; $Eu_2O_3$, 35.2; $Y_2O_3$, 22.6 |
| 26 | $(Gd_{0.95}Nd_{0.05})_2(MoO_4)_3$ | 431.8 | $Gd_2O_3$, 343.7; $Nd_2O_3$, 16.8 |
| 27 | $(Gd_{0.8}Tb_{0.2}Y_{0.1})_2(MoO_4)_3$ | 431.8 | $Gd_2O_3$, 217.0; $Tb_4O_7$, 78.8; $Y_2O_3$, 22.6; $La_2O_3$, 32.6 |
| 28 | $Gd_2(Mo_{0.95}W_{0.1}O_4)_3(MoO_4)_3$ | 431.8 | $Wo_5$, 70.0 |
| 29 | $(Sm_{0.5}Eu_{0.5})_2(MoO_4)_3$ | 431.8 | $Sm_2O_3$, 174.1; $Eu_2O_3$, 176.0 |
| 30 | $(Sm_{0.5}Dy_{0.5})_2(MoO_4)_3$ | 431.8 | $Sm_2O_3$, 174.1; $Dy_2O_3$, 186.5 |
| 31 | $(Sm_{0.5}Tb_{0.5})_2(MoO_4)_3$ | 431.8 | $Sm_2O_3$, 174.1; $Tb_4O_7$, 187.5 |
| 32 | $(Sm_{0.95}Yb_{0.05})_2(MoO_4)_3$ | 431.8 | $Sm_2O_3$, 331.3; $Yb_2O_3$, 18.7 |
| 33 | $(Sm_{0.95}Ho_{0.05})_2(MoO_4)_3$ | 431.8 | $Sm_2O_3$, 331.3; $Ho_2O_3$, 18.9 |
| 34 | $(Sm_{0.95}Lu_{0.05})_2(MoO_4)_3$ | 431.8 | $Sm_2O_3$, 331.3; $Lu_2O_3$, 19.9 |
| 35 | $(Sm_{0.95}Tm_{0.05})_2(MoO_4)_3$ | 431.8 | $Sm_2O_3$, 331.3; $Tm_2O_3$, 19.3 |
| 36 | $(Sm_{0.95}Sc_{0.05})_2(MoO_4)_3$ | 431.8 | $Sm_2O_3$, 331.3; $Sc_2O_3$, 6.9 |
| 37 | $(Sm_{0.95}Y_{0.05})_2(MoO_4)_3$ | 431.8 | $Sm_2O_3$, 331.3; $Y_2O_3$, 11.3 |
| 38 | $(Sm_{0.90}Er_{0.1})_2(MoO_4)_3$ | 431.8 | $Sm_2O_3$, 313.4; $Er_2O_3$, 19.1 |
| 39 | $(Sm_{0.6}Eu_{0.3}Er_{0.1})_2(MoO_4)_3$ | 431.8 | $Sm_2O_2$, 209.4; $Er_2O_3$, 105.4; $Er_2O_3$, 19.1 |
| 40 | $(Sm_{0.7}Tb_{0.2}Y_{0.1})_2(MoO_4)_3$ | 431.8 | $Sm_2O_3$, 244.0; $Tb_4O_7$, 78.8; $Y_2O_3$, 22.6 |
| 41 | $(Sm_{0.8}Er_{0.1}Y_{0.1})_2(MoO_4)_3$ | 431.8 | $Sm_2O_3$, 278.9; $Y_2O_3$, 22.6; $Er_2O_3$, 19.1 |
| 42 | $(Sm_{0.8}Dy_{0.1}Y_{0.05}Er_{0.05})_2(MoO_4)_3$ | 431.8 | $Sm_2O_3$, 278.9; $Dy_2O_3$, 37.3; $Y_2O_3$, 11.3; $Er_2O_3$, 9.5 |
| 43 | $(Sm_{0.5}Tb_{0.5})_2(Mo_{0.90}W_{0.1})_3$ | 388.6 | $Wo_3$, 70.0; $Sm_2O_3$, 174.1; $Tb_4O_7$, 187.2 |
| 44 | $(Dy_{0.95}La_{0.05})_2(MoO_4)_3$ | 431.8 | $Dy_2O_3$, 369.3; $La_2O_3$, 16.3 |
| 45 | $(Dy_{0.95}Pr_{0.05})_2(MoO_4)_3$ | 431.8 | $Dy_2O_3$, 369.3; $Pr_6O_{11}$, 17.0 |
| 46 | $(Dy_{0.95}Nd_{0.05})_2(MoO_4)_3$ | 431.8 | $Nd_2O_3$, 16.8; $Dy_2O_3$, 369.3 |
| 47 | $(Dy_{0.8}Nd_{0.10}Ho_{0.10})_2(MoO_4)_3$ | 431.8 | $Dy_2O_3$, 298.4; $Ho_2O_3$, 37.8; $Nd_2O_3$, 33.7 |
| 48 | $(Eu_{0.6}Tb_{0.26}Dy_{0.2})_2(MoO_4)_3$ | 431.8 | $Eu_2O_3$, 211.2; $Dy_2O_3$, 74.6; $Tb_4O_7$, 102.4 |
| 49 | $(Gd_{0.5}Eu_{0.2}Sm_{0.1}Tb_{0.1}Dy_{0.1})(MoO_4)_3$ | 431.8 | $Gd_2O_3$, 217.0; $Sm_2O_3$, 34.9; $Eu_2O_3$, 70.4; $Dy_2O_3$, 37.3; $Tb_4O_7$, 39.4 |

We claim:

1. A digital light deflector comprising a quarterwave plate, an irregular ferroelectric crystal cut at its opposite surfaces perpendicularly to the $z$-axis thereof with a thickness of a quarter-wavelength and a uniaxial birefringent crystal cut at its opposite surfaces with a specified angle to an optic axis, wherein said plate and said crystals are disposed in parallel to each other, and further comprising transparent electrodes on the opposite $z$-planes of said irregular ferroelectric crystal and an electrical means for applying an electric field at least equal to the coercive field of said irregular ferroelectric crystal thereto through said electrodes.

2. A digital light deflector comprising a plurality of stages constituted by a quarter-wave plate, an irregular ferroelectric crystal cut at its opposite surfaces perpendicularly to the $z$-axis thereof with a thickness of a quarter-wavelength and a uniaxial birefringent crystal cut at its opposite surfaces with a specified angle to an optic axis, wherein said plate and said crystals are disposed in parallel to one another and the thickness of said uniaxial birefringent crystal is selected to increase or decrease with an integral ratio from one stage to the next, and further comprising transparent electrodes on the opposite $z$-planes of said respective irregular ferroelectric crystals and electrical means for applying an electric field at least equal to the coercive field of said crystal thereto through said electrodes.

3. A digital light deflector according to claim 2, wherein gadolinium molybdate is used for an irregular ferroelectric crystal.

4. A digital light deflector comprising four devices constituted by a quarter-wave plate, an irregular ferroelectric crystal cut at its opposite surfaces perpendicularly to the $z$-axis thereof with a thickness of a quarter-wavelength and a uniaxial birefringent crystal cut at its opposite surfaces with a specified angle to an optic axis, said plate and said crystals arranged in parallel to one another with respect to their surfaces, wherein two groups of devices, which are respectively arranged in such a manner that thickness of said uniaxial birefringent crystals are related to one another in an integral ratio and the optical axes of said crystals are in parallel to one another, are arranged in cascade fashion in such a manner that the optical axes in one group are perpendicular to those in the other group, and further comprising transparent electrodes on the opposite $z$-planes of said respective irregular ferroelectric crystals and electrical means for applying an electric field at least equal to the coercive field of said crystals thereto through said electrodes.

5. A digital light deflector according to claim 4, wherein gadolinium molybdate is used for said irregular ferroelectric crystal.

References Cited

UNITED STATES PATENTS

| | | | |
|---|---|---|---|
| 3,499,700 | 3/1970 | Harris et al. | 350—DIG. 2 |
| 3,559,185 | 1/1971 | Burns et al. | 350—157 |
| 3,329,474 | 7/1967 | Harris et al. | 350—DIG. 2 |
| 3,391,972 | 7/1968 | Harris et al. | 350—DIG. 2 |

OTHER REFERENCES

Smith et al.: "Optical Properties and Switching in $Gd_2(MoO_4)_3$" Phys Lett., vol. 28A, 7 (Jan. 13, 1969), pp. 501–502.

DAVID SCHONBERG, Primary Examiner

P. R. MILLER, Assistant Examiner

U.S. Cl. X.R.

350—149, 157 DIG. 2